US009640977B2

(12) United States Patent
Li et al.

(10) Patent No.: US 9,640,977 B2
(45) Date of Patent: May 2, 2017

(54) LEAKAGE CURRENT DETECTING CIRCUIT-BREAKER WITH A FLEXIBLE SHIELD CORD

(71) Applicant: HUNAN XIANGYI RAILROAD LOCOMOTIVE ELECTRICAL EQUIPMENT CO, LTD, Zhuzhou (CN)

(72) Inventors: Suhong Li, Zhuzhou (CN); Yunxiang Wu, Zhuzhou (CN)

(73) Assignee: Hunan Xiangyi Railroad Locomotive Electric Equip, Zhuzhou (CN)

( * ) Notice: Subject to any disclaimer, the term of this patent is extended or adjusted under 35 U.S.C. 154(b) by 257 days.

(21) Appl. No.: 14/517,438

(22) Filed: Oct. 17, 2014

(65) Prior Publication Data
US 2016/0111869 A1 Apr. 21, 2016

(51) Int. Cl.
*H02H 3/16* (2006.01)
*H02H 3/33* (2006.01)

(52) U.S. Cl.
CPC .................................... *H02H 3/33* (2013.01)

(58) Field of Classification Search
CPC .................................. H02H 3/16; H02H 3/33
USPC .......................................................... 361/42
See application file for complete search history.

(56) References Cited

U.S. PATENT DOCUMENTS

2006/0061924 A1\* 3/2006 Zhang ................. H01R 13/652
361/42
2008/0007878 A1\* 1/2008 Gandolfi ............... H01B 9/028
361/42

\* cited by examiner

*Primary Examiner* — Thienvu Tran
*Assistant Examiner* — Kevin J Comber
(74) *Attorney, Agent, or Firm* — Hogan Lovells US LLP

(57) ABSTRACT

The present invention discloses a leakage current detecting circuit-breaker with a flexible shield cord, which comprises a detection circuit, a trigger circuit and a tripping mechanism. The detection circuit comprises a flexible shield cord, a zero sequence current transformer and diodes connected in series. The flexible shield cord comprises a foil wrapped around outer insulating layers of a live line and a neutral line and a tinned copper wire between the outer insulating layers and the foil. The flexible shield cord senses an abnormal or fault signal of a power line, and the zero sequence current transformer amplifies the abnormal or fault signal to such an extent as to trigger the trigger circuit. The diodes comprise a fifth diode and a sixth diode; anodes of the fifth diode and the sixth diode are connected to each other, and cathodes of the fifth diode and the sixth diode are respectively connected to the live line and the neutral line. The leakage current detecting circuit-breaker is of low production cost and strong anti-interference capacity.

3 Claims, 5 Drawing Sheets

LEAKAGE CURRENT DETECTING CIRCUIT-BREAKER WITH A FLEXIBLE SHIELD CORD

TECHNICAL FIELD

The invention relates to the field of leakage current protection, more particularly, to a leakage current detecting circuit-breaker.

BACKGROUND ART

With the social progress and rapid economic development, leakage current protecting products are more and more widely used in people's daily life and work. In order to protect various electrical devices in a circuit and to detect a leakage current in the circuit in time, a leakage current detecting circuit-breaker is generally arranged in the circuit. The leakage current detecting circuit-breaker is such a device that it can promptly detect and amplify a leakage current signal to control a tripping mechanism so as to immediately disconnect a power supply, when there is a leakage current or an electric arc between a live line (L-line) and a neutral line (N-line), thereby protecting the personal and property safety. A leakage current detecting circuit-breaker generally comprises a detection circuit, a trigger circuit and a tripping mechanism. In the conventional art, a chip of a regular leakage current detecting circuit-breaker is used as the central control module and functions to amplify a leakage current signal in the case that the leakage current or an electric arc is detected. The requirement of the amplification chip makes the production cost of the conventional leakage current detecting circuit-breaker high. Moreover, the anti-interference performance of the currently available leakage current detecting circuit-breakers is poor, which can easily cause false triggering of the leakage current detecting circuit-breaker.

DISCLOSURE OF THE INVENTION

In order to overcome the above disadvantages of the conventional art, the invention provides a leakage current detecting circuit-breaker which is of low production cost and strong anti-interference capacity.

According to the technical solution of the present invention, a leakage current detecting circuit-breaker comprises a detection circuit, a trigger circuit and a tripping mechanism, wherein the detection circuit detects and amplifies an abnormal or fault signal of a power line and transmits the amplified signal to the trigger circuit, such that the trigger circuit is turned on, thereby controlling the tripping mechanism to be disengaged and then disconnecting a current connection to a load end. The detection circuit comprises a flexible shield cord, a zero sequence current transformer and diodes connected in series. The flexible shield cord comprises a foil wrapped around outer insulating layers of a L line and a N line and a tinned copper wired between the outer insulating layers and the foil. The flexible shield cord senses the abnormal or fault signal of the power line, and the zero sequence current transformer amplifies the abnormal or fault signal to such an extent as to trigger the trigger circuit. The diodes comprise a fifth diode and a sixth diode, where anodes of the fifth diode and the sixth diode are connected to each other, and cathodes of the fifth diode and the sixth diode are respectively connected to the L line and the N line. When leakage current occurs during normal operation, an unbalanced signal generated by the leakage current is transmitted to the zero sequence current transformer via the flexible shield cord; the unbalanced signal is amplified by the zero sequence current transformer and then outputted to the trigger circuit, turning the trigger circuit on, thereby controlling the tripping mechanism to be disengaged and ensuring the safe operation of devices on the load end.

As an example, the detection circuit further comprises an operating current limiting resistor, a testing current limiting resistor and a test button. The operating current limiting resistor is connected in series between the flexible shield cord and a primary coil of the zero sequence current transformer; the testing current limiting resistor and the test button are connected in series between the L-line and the primary coil of the zero sequence current transformer. The provision of the operating current limiting resistor and the testing current limiting resistor has the effect of bypassing voltage, so as to limit the leakage current of the leakage current detecting circuit-breaker during normal operation and test.

As an example, the trigger circuit comprises a rectifier bridge, a silicon controlled rectifier and a tripping coil connected in series. A gate of the silicon controlled rectifier is connected to an output terminal of the zero sequence current transformer; power is supplied to the rectifier bridge via the L-line and the N-line. When a leakage current is present in the power line, the leakage current is transmitted to the primary coil of the zero sequence current transformer via the flexible shield cord, and arrives at the output terminal of the zero sequence current transformer after being amplified, turning the silicon controlled rectifier turn on, thereby providing power to the tripping coil, and then controlling the tripping mechanism to be disconnected (a movable contact and a static contact are disconnected).

As an example, the trigger circuit further comprises an anti-interference circuit, which is connected in parallel between the anode and the cathode of the silicon controlled rectifier and comprises a second capacitor connected to the anode of the silicon controlled rectifier and a fourth resistor connected to the cathode of the silicon controlled rectifier. The provision of the anti-interference circuit prevents external interferences from causing misoperation of the leakage current detecting circuit-breaker.

As an example, the trigger circuit further comprises a protection circuit, which comprises a first capacitor and a third current limiting resistor respectively connected in parallel between output terminals of the zero sequence current transformer. The first capacitor being connected in parallel prevents misoperation of the triggering circuit due to installation or wiring mistakes. The third current limiting resistor being connected in parallel can provide suitable current to the gate of the silicon controlled rectifier. Thus, the protection circuit can protect the silicon controlled rectifier, preventing the silicon controlled rectifier from being damaged due to electric parameters applied thereto being larger than rated electric parameters for an extended period of time.

As an example, the tripping coil comprises a fixed frame, an iron core, an iron core reset spring, a pulling tab and a reed bridge. The fixed frame is integrated with a coil framework. The iron core reset spring is located at one end of the iron core and both are arranged within the fixing frame. The other end of the iron core is provided with a clamping groove. One end of the pulling tab is fixed in the clamping groove, and the other end is inserted into the reed bridge. In the leakage current detecting circuit-breaker of the present invention, integration of the fixed frame and the coil framework prevents possible errors during assembly and improves reliability of the assembly.

As an example, the tripping mechanism comprises a reset switch, a circuit board and a contact switch. Power is supplied to the rectifier bridge by closing the reset switch, which is arranged as perpendicular to the circuit board, and the contact switch is actuated by the tripping coil. Through the closure of the reset switch, power is supplied to the rectifier bridge. When the leakage current occurs in the power line, the power is supplied to the tripping coil, which then actuates the contact switch.

As an example, the reset switch comprises a reset button and a reset spring, and the reset button comprises a reset press-button and a pulling rod fixed together through injection molding. The reset switch can move up and down inside of the tripping mechanism, so as to control turning on or off of the contact switch.

As an example, the tripping mechanism further comprises a base seat and an upper cover closed together by screws, a test button is protruded from the upper cover, and an upper surface of the upper cover is provided with bosses to prevent the test button from being false triggered.

As an example, the contact switch comprises a static contact, a static contact fixing sheet, a movable contact and a reed. The static contact is riveted to the circuit board through the static contact fixing sheet; the movable contact is riveted to the reed. Positions of the static contact and the movable contact correspond with each other, and the reed and the reed bridge are fixed together vertically through injection molding.

The present invention has the following advantageous effects: the leakage current on the flexible shield cord is detected and amplified by using the unbalanced property of the zero sequence current transformer. It is verified that amplifying the leakage current by using the zero sequence current transformer in place of the chip is safe and reliable, which reduces the production cost of the circuit-breaker protection device. In addition, the leakage current detecting circuit-breaker provided by the present invention has strong anti-interference capacity.

BRIEF DESCRIPTION OF DRAWINGS

The present invention will be described in detail in conjunction with the drawings in the following.

DETAILED DESCRIPTION

In the following, embodiments of the invention will be described in detail with reference to the drawings. The exemplary embodiments are provided to make it possible for a person of ordinary skilled in the art to clearly understand the present invention and to implement the present invention according to the description. The drawings and detailed embodiments are not intended to limit the present invention; instead the scope of the invention is defined by the appended claims.

Figure 1:
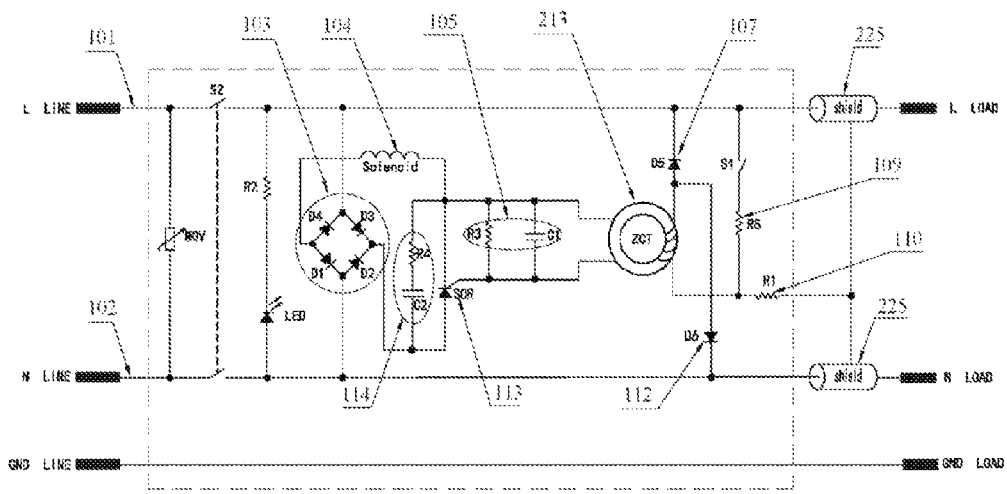
FIG. 1 illustrates a schematic circuit diagram of a leakage current detecting circuit-breaker with a flexible shield cord in accordance with the present invention.

FIG. 1 illustrates a schematic circuit diagram of a leakage current detecting circuit-breaker with a flexible shield cord in accordance with the present invention. The leakage current detecting circuit-breaker of the present invention comprises a detection circuit, a trigger circuit and a tripping mechanism. The operation principle of the leakage current detecting circuit-breaker is as follows: the detection circuit detects and amplifies an abnormal or fault signal of a power line and transmits the amplified signal to the trigger circuit, turning the trigger circuit on, thereby controlling the tripping mechanism to be disengaged and then disconnecting a current connection to a load end.

Figure 5:
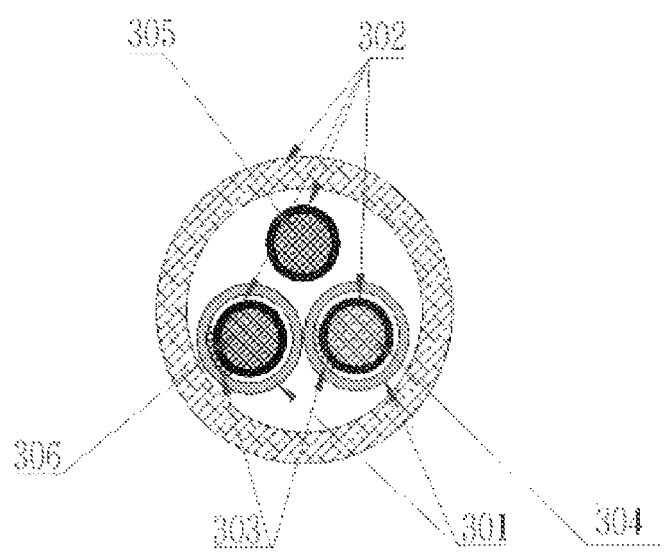
FIG. 5 illustrates a cross section view of a flexible shield cord of the leakage current detecting circuit-breaker.

As illustrated in FIG. 1, the detection circuit comprises a flexible shield cord 225, a zero sequence current transformer (ZSCT) 213 and diodes connected in series. FIG. 5 illustrates a cross section of the flexible shield cord of the leakage current detecting circuit-breaker. As shown in FIG. 5, the flexible shield cord 225 comprises a L-line 101, a N-line 102 and a ground (GND) line, wherein the L-line, the L-line and the GND line respectively comprise a L-line core 304, a N-line core 306, a GND-line core 305 and outer insulating layers 302 wrapped around the L-line core, the N-line core and the GND-line core. The flexible shield cord 225 further comprises a foil 301 wrapped around the outer insulating layers 302 of the L-line and the N-line and a tinned copper wire between the outer insulating layers and the foil. The flexible shield cord 225 can sense the abnormal or fault signal of the power line, that is, it may function to detect abnormal leakage currents between the L-line 101 and the N-line 102, between the L-line 101 and the GND-line, as well as between the N-line 102 and the GND line. The abnormal or fault signal is transmitted to the ZSCT 213, which amplifies the abnormal or fault signal to such an extent as to trigger the trigger circuit.

As an example, in the flexible shield cord of the invention, a conductive side of the foil 301 faces inwards and the tinned copper wire 303 may be 8 tinned copper wires with a diameter of Φ0.16 mm.

As an example, for a 14 AWG power line, cores of the L-line, the N-line and the GND lines may be made of 41 copper wires of Φ0.254 mm, which will respectively has an outer diameter of Φ3.5 mm with the outer insulating layer. The outer diameter of the whole flexible shield cord may be Φ10.3 mm. As another example, for a 16 AWG or 18 AWG power cord, cores of the L-line, the N-line and the GND line may be respectively made of 26 copper wires of Φ0.254 mm or 41 copper wires of Φ0.160 mm, which will respectively has an outer diameter of Φ3.1 mm or Φ2.8 mm with the outer insulating layer. The outer diameter of the whole flexible shield cord may be Φ9.60 mm or Φ9.10 mm.

In the detection circuit, the diodes comprise a fifth diode (D5) 107 and a sixth diode (D6) 112. Anodes of the fifth diode 107 and the sixth diode 112 are connected to each other, and cathodes of which are respectively connected to the L-line 101 and the N-line 102. As the fifth diode 107 and the sixth diode 112 are half wave rectifier components, the leakage current, may it be on the L-line 101 or on the N-line 102, can always be detected by the detection circuit of the invention. For example, if there is leakage current on the L-line 101, a signal of the leakage current passes through the flexible shield cord 225 and the primary coil of the ZSCT 213, and arrives at the N-line 102 via the sixth diode 112, thus forming a loop circuit. If there is leakage current in the N-line 102, a signal of the leakage current passes through the flexible shield cord 225 and the primary coil of the ZSCT 213, and arrives at the L-line 101 via the fifth diode 107, thus forming a loop circuit.

The detection circuit of the present invention further comprises an operating current limiting resistor (R1) 110, a testing current limiting resistor (R5) 109 and a test button (S1 of FIG. 1). The operating current limiting resistor 110 is connected in series between the flexible shield cord 225 and the primary coil of the ZSCT 213, and the testing current limiting resistor 109 and the test button are connected in series between the L-line 101 and the primary coil of the ZSCT 213. The operating current limiting resistor 110 functions to limit the current during normal operation of the leakage current detecting circuit-breaker of the present invention, and the testing current limiting resistor 109 functions to limit the current during test and is turned on via the test button (S1).

As shown in FIG. 1, the trigger circuit comprises a rectifier bridge 103, a silicon controlled rectifier 113 and a tripping coil 104 connected in series. The gate of the silicon controlled rectifier 113 is connected to an output terminal of the ZSCT 213, the rectifier bridge 103 is connected in parallel between the L-line and the N-line of the power line and is thus powered. When a leakage current occurs in the power line, the leakage current is transmitted to the primary coil of the ZSCT 213 via the flexible shield cord 225, and arrives at the output terminal of the ZSCT 213 after being amplified, turning the silicon controlled rectifier 113 on, supplying power to the tripping coil 104, and then controlling the tripping mechanism to be disconnected (a movable contact and a static contact are disconnected).

Figure 2:
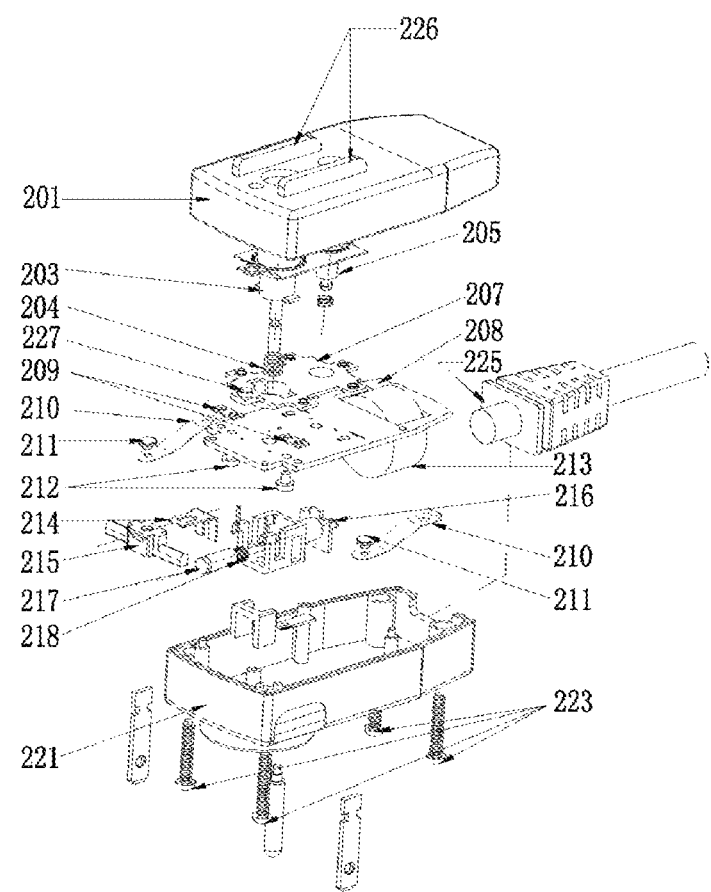
FIG. 2 illustrates an exploded perspective view of the mechanical structure of the leakage current detecting circuit-breaker with a flexible shield cord in accordance to the present invention.
Figure 3:
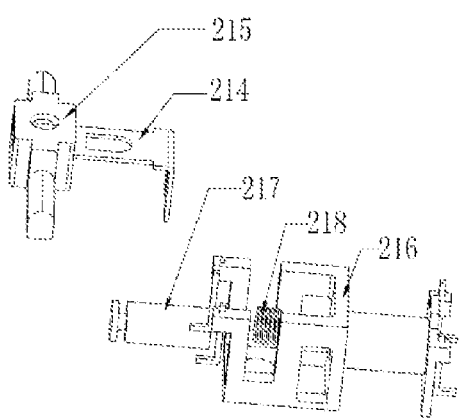
FIG. 3 illustrates an exploded perspective view of a tripping coil in FIG. 2.

FIG. 2 illustrates an exploded perspective view of the mechanical structure of the leakage current detecting circuit-breaker with a flexible shield cord in accordance with the present invention. FIG. 3 illustrates an exploded perspective view of a tripping coil 104 of FIG. 2. As shown in FIGS. 2 and 3, the tripping coil 104 comprises a fixed frame 216, an iron core 217, an iron core reset spring 218, a pulling tab 214 and a reed bridge 215, wherein the fixed frame 216 is integrated with a coil framework, that is, the fixed frame 216 is a fixed frame having the coil framework. The iron core reset spring 218 is located at one end of the iron core 217 and both are arranged within the fixing frame 216, the other end of the iron core 217 is provided with a clamping groove (no reference number indicated for which in the figures). One end of the pulling tab 214 is fixed in the clamping groove, and the other end is inserted into the reed bridge 215 and corresponds to a clamping groove of a pulling rod of a reset button 203. The fixing frame 216 is fixed on a circuit board 208 through a CP wire (copper-tinlead wire). In the leakage current detecting circuit-breaker of the present invention, integration of the fixed frame and the coil framework prevents possible assembly mistakes and improves reliability of the assembly.

It can be seen from FIG. 1 that the trigger circuit further comprises an anti-interference circuit 114, which is connected in parallel between anode and cathode of the silicon controlled rectifier 113 and comprises a second capacitor (C2) connected to the anode of the silicon controlled rectifier 113 and a fourth resistor (R4) connected to the cathode of the silicon controlled rectifier 113. The anti-interference circuit 114 protects the silicon controlled rectifier 113, preventing misoperation of the leakage current detecting circuit-breaker caused by external interferences. The external interferences generally comprise voltage interference, electrical equipment interference and environmental interference.

As illustrated in FIG. 1, the trigger circuit further comprises a protection circuit 105, which comprises a first capacitor (C1) and a third current limiting resistor (R3) respectively connected in parallel between output terminals of the ZSCT 213. The first capacitor (C1) being connected in parallel prevents misoperation by the triggering circuit due to installation or wiring mistakes. The third current limiting resistor (R3) provides a current limiting signal to the silicon controlled rectifier 113, enabling the provision of a suitable current to the gate of the silicon controlled rectifier. Thus, the protection circuit can protect the silicon controlled rectifier, thereby preventing the silicon controlled rectifier from being damaged due to electric parameters applied thereto being larger than rated electric parameters for an extended time. In case the flexible shield cord 225 detects an abnormal current signal during normal operation of the leakage current detecting circuit-breaker of the present invention, the abnormal current signal passes through the primary coil of the ZSCT 213 and is amplified by the ZSCT 213. After being current-limited by the third current limiting resistor (R3), a signal current is provided to trigger the gate of the silicon controlled rectifier 113, which is then turned on, thus providing power to the tripping coil 104.

As shown in FIGS. 1 and 2, the tripping mechanism comprises a reset switch (S2), the circuit board 208 and a contact switch. Power is supplied to the rectifier bridge 103 when the reset switch (S2) is closed. The reset switch (S2) is arranged as perpendicular to the circuit board 208, and the contact switch is actuated by the tripping coil 104. Through the closure of the reset switch, power is supplied to the rectifier bridge 103. When the leakage current occurs in the power line, power is supplied to the tripping coil 104, which then actuates the contact switch.

Figure 4:
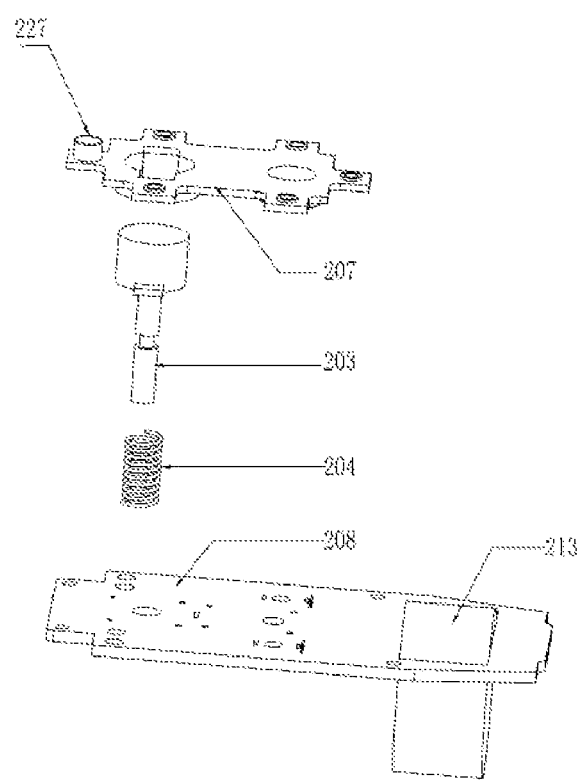
FIG. 4 illustrates an exploded perspective view of a reset switch and a circuit board in FIG. 2.

FIG. 4 illustrates an exploded perspective view of the reset switch and the circuit board of FIG. 2. As shown in FIGS. 2 and 4, the reset switch (S2) comprises a reset button 203 and a reset spring 204, and the reset button 203 comprises a reset press-button and a pulling rod fixed together through injection molding. The tripping mechanism further comprises a base seat 221 and an upper cover 201 closed together by screws 223, a test button 205 is protruded from the upper cover 201, and an upper surface of the upper cover 201 is provided with bosses 226 for preventing the test button 205 from being false triggered. A height of the bosses 226 is higher than a height of the test button 205 protruded above the upper surface of the upper cover 201. A press cover 207 is provided on an inner surface of the upper cover 201, and a shade sheet 227 is provided on the press cover 207, where the shade sheet 227 is dustproof and has the effect of presenting working state of the leakage current detecting circuit-breaker.

As shown in FIG. 2, the contact switch comprises a static contact 212, a static contact fixing sheet 209, a movable contact 211 and a reed 210, where the static contact 212 is riveted to the circuit board 208 through the static contact fixing sheet 209, the movable contact 211 is riveted to the reed 210, positions of the static contact 212 and the movable contact 211 correspond to each other, and the reed 210 and the reed bridge 215 are fixed together vertically through injection molding.

Action process during normal operation of the tripping mechanism of the leakage current detecting circuit-breaker according to the present invention will be described in the following.

When no leakage current exists in the power line, the reset switch (S2) is closed, and the movable contact 211 and the static contact 212 are connected, thereby supplying power to the rectifier bridge 103. When there is a leakage current in the power line, the current signal amplified by the ZSCT 213 turns the gate of the silicon controlled rectifier 113 on, thereby supplying power to the tripping coil 104. The fixed frame 216 integrated with the coil framework turns on, allowing the iron core 217 to overcome acting force of the iron core reset spring 218 and to move toward the right and rear direction shown in FIG. 2 or to the right direction shown in FIG. 3. As one end of the pulling tab 214 is fixed in the clamping groove of the iron core 217, the pulling tab 214 is forced to move along this direction. The pulling tab 214 is moved outside of the clamping groove of the pulling rod of the reset button 203, the reset button 203 moves upwards under the acting force of the reset spring 204, the reed bridge 215 moves downwards under the acting force of the reed 210, thus separating the movable contact 211 and the static contact 212, completing the tripping operation and then disconnecting the current connection to the load end, thereby ensuring the safety of use of devices on the load end.

The reset operation of the reset switch (S2) will be described in the following. The reset button 203 can move vertically only as a result of its position and the reed bridge 215 also moves vertically under the action of the pulling rod of the reset button 203. When the reset button 203 is pressed, the pulling rod of the reset button 203 will move downwards. When the clamping groove at the lower end of the pulling rod is flush with the pulling tab 214, the iron core 217 pushes the pulling tab 214 to move forwards under the acting force of the iron core reset spring 218, making the front end of the pulling tab 214 to be directly clamped in the clamping groove of the pulling rod. When the reset button 203 is released, the reset button 203 will move upwards under the acting force of the reset spring 204, and the pulling tab 214 moves upward together with the reset button 203, bringing the reed bridge 215 and the reed 210 to move upwards together. When the movable contact 211 and the static contact 212 are connected, the movement is stopped, the reset operation is completed, and the input and output of the leakage current detecting circuit-breaker are turned on.

In the leakage current detecting circuit-breaker with the flexible shield cord of the present invention, the ZSCT is used in place of chip to amplify the leakage current, which safely and reliably reduces the production cost of circuit-breaker protection device. Moreover, the leakage current detecting circuit-breaker with the flexible shield cord provided by the present invention has a strong anti-interference capability.

What are described above is merely the preferable embodiments of the present invention and does not intend to limit the present invention. Various modifications and changes may be made by a person of ordinary skill in the art to the present invention. Any amendment, replacement and improvement made without departing from the spirit and principle of the present invention are within the protection scope of the present invention.

What is claimed is:

1. A leakage current detecting circuit-breaker with a flexible shield cord comprising a detection circuit, a trigger circuit and a tripping mechanism, wherein the detection circuit detects and amplifies an abnormal or fault signal of a power line and transmits the amplified signal to the trigger circuit, so that the trigger circuit is turned on, thereby controlling the tripping mechanism to be disengaged and then disconnecting a current connection to a load end,
wherein the detection circuit comprises a flexible shield cord, a zero sequence current transformer and diodes connected in series, the flexible shield cord comprises a metal foil wrapped around outer insulating layers of a live line and a neutral line and a tinned copper wire between the outer insulating layers and the foil, the flexible shield cord senses the abnormal or fault signal of the power line, the zero sequence current transformer amplifies the abnormal or fault signal to such an extent as to trigger the trigger circuit, the diodes comprise a fifth diode and a sixth diode, anodes of the fifth diode and the sixth diode are connected to each other, and cathodes of the fifth diode and the sixth diode are respectively connected to the live line and the neutral line;
wherein the trigger circuit comprises a rectifier bridge, a silicon controlled rectifier and a tripping coil connected in series, a gate of the silicon controlled rectifier is connected to an output terminal of the zero sequence current transformer, and power is supplied to the rectifier bridge via the live line and the neutral line;
wherein the trigger circuit further comprises an anti-interference circuit the anti-interference circuit is connected in parallel between an anode and a cathode of the silicon controlled rectifier and comprises a second capacitor connected to the anode of the silicon controlled rectifier and a fourth resistor connected to the cathode of the silicon controlled rectifier.

2. The leakage current detecting circuit-breaker with a flexible shield cord according to claim 1, wherein the trigger circuit further comprises a protection circuit, the protection circuit comprises a first capacitor and a third current limiting resistor respectively connected in parallel between output terminals of the zero sequence current transformer.

3. A leakage current detecting circuit-breaker with a flexible shield cord, comprising a detection circuit, a trigger circuit and a tripping mechanism, wherein the detection circuit detects and amplifies an abnormal or fault signal of a power line and transmits the amplified signal to the trigger circuit, so that the trigger circuit is turned on, thereby controlling the tripping mechanism to be disengaged and then disconnecting a current connection to a load end,
wherein the detection circuit comprises a flexible shield cord, a zero sequence current transformer and diodes connected in series, the flexible shield cord comprises a metal foil wrapped around outer insulating layers of a live line and a neutral line and a tinned copper wire between the outer insulating layers and the foil, the flexible shield cord senses the abnormal or fault signal of the power line, the zero sequence current transformer amplifies the abnormal or fault signal to such an extent as to trigger the trigger circuit, the diodes comprise a fifth diode and a sixth diode, anodes of the fifth diode and the sixth diode are connected to each other, and cathodes of the fifth diode and the sixth diode are respectively connected to the live line and the neutral line;
wherein the trigger circuit comprises a rectifier bridge, a silicon controlled rectifier and a tripping coil connected in series, a gate of the silicon controlled rectifier is connected to an output terminal of the zero sequence current transformer, and power is supplied to the rectifier bridge via the live line and the neutral line;
wherein the tripping coil comprises a fixed frame, an iron core, an iron core reset spring, a pulling tab and a reed bridge, the fixed frame is integrated with a coil framework, the iron core reset spring is located at one end of the iron core and both the iron core reset spring and the iron core are arranged within the fixed frame, the other end of the iron core is provided with a clamping groove, one end of the pulling tab is fixed in the clamping groove, and the other end is inserted into the reed bridge;

wherein the tripping mechanism comprises a reset switch, a circuit board and a contact switch, power is supplied to the rectifier bridge through the closure of the reset switch, the reset switch is arranged as perpendicular to the circuit board, and the contact switch is actuated by the tripping coil;

wherein the contact switch comprises a static contact, a static contact fixing sheet, a movable contact and a reed, the static contact is riveted to the circuit board through the static contact fixing sheet, the movable contact is riveted to the reed, positions of the static contact and the movable contact correspond to each other, and the reed and the reed bridge are fixed together vertically through injection molding.

\* \* \* \* \*